US00RE41787E

(19) United States
(12) Reissued Patent
Lai et al.

(10) Patent Number: US RE41,787 E
(45) Date of Reissued Patent: Sep. 28, 2010

(54) METHOD AND CIRCUIT FOR GENERATING A TRACKING ERROR SIGNAL USING DIFFERENTIAL PHASE DETECTION

(76) Inventors: Yi-Lin Lai, 8F, No. 533, Chung-Cheng Rd., Hsin-Tien, Taipei (TW); Saga Wang, 8F, No. 533, Chung-Cheng Rd., Hsin-Tien, Taipei (TW)

(21) Appl. No.: 12/350,706

(22) Filed: Jan. 8, 2009

Related U.S. Patent Documents

Reissue of:
(64) Patent No.: 7,161,877
Issued: Jan. 9, 2007
Appl. No.: 10/697,102
Filed: Oct. 31, 2003

(30) Foreign Application Priority Data

Jul. 18, 2003 (TW) ..... 92119638 A

(51) Int. Cl.
*G06K 5/04* (2006.01)
*G11B 20/20* (2006.01)
*G11B 21/08* (2006.01)

(52) U.S. Cl. ..... 714/700; 714/709; 714/707; 714/744; 369/30.21; 369/30.22; 369/33.01; 369/44.32; 369/44.41

(58) Field of Classification Search ..... None
See application file for complete search history.

(56) References Cited

U.S. PATENT DOCUMENTS 4,115,759 A * 9/1978 Besenfelder ..... 714/700
4,476,555 A * 10/1984 Joichi et al. ..... 369/44.32
4,740,940 A * 4/1988 Tanaka et al. ..... 369/44.25
5,033,041 A * 7/1991 Schroder ..... 369/44.32
5,225,755 A * 7/1993 Okamoto ..... 318/685
5,515,403 A * 5/1996 Sloan et al. ..... 375/371
5,619,509 A * 4/1997 Maruyama et al. ..... 714/707
6,345,020 B1 * 2/2002 Cho et al. ..... 369/44.32
6,977,982 B2 * 12/2005 Ma et al. ..... 375/375
6,992,953 B2 * 1/2006 Sato et al. ..... 369/44.32
2004/0160866 A1 * 8/2004 Huang et al. ..... 369/44.34

* cited by examiner

*Primary Examiner*—John P Trimmings
(74) *Attorney, Agent, or Firm*—Perkins Coie LLP

(57) ABSTRACT

A circuit for generating tracking error signal using differential phase detection, comprising a quadrant photodetector for receiving optical signal and inducting splitting signal A, splitting signal B, splitting signal C and splitting signal D, two adders for generating group signal (A+C) and group signal (B+D). A plurality of equalizers for receiving, equalizing and amplifying splitting signal A, splitting signal B, splitting signal C, splitting signal D, group signal (A+C) and group signal (B+D). A plurality of phase detectors for receiving the output of equalizers and comparing phase difference of splitting signal A and group signal (A+C), group signal (A+C) and splitting signal B, splitting signal C and group signal (B+D), and group signal (B+D) and splitting signal D, and outputting a plurality of adjustment signals respectively. A circuit for eliminating the phase difference by adding and subtracting some adjustment signals with same phase difference. A comparator for receiving and comparing the output of the circuit to obtain a tracking error signal.

30 Claims, 6 Drawing Sheets

METHOD AND CIRCUIT FOR GENERATING A TRACKING ERROR SIGNAL USING DIFFERENTIAL PHASE DETECTION

Matter enclosed in heavy brackets [ ] appears in the original patent but forms no part of this reissue specification; matter printed in italics indicates the additions made by reissue.

CROSS-REFERENCE TO RELATED APPLICATION

This *patent* application *is a reissue application for commonly assigned U.S. Pat. No. 7,161,877, issued Jan. 9, 2007, from U.S. patent application Ser. No. 10/697,102, filed Oct. 31, 2003, which* claims the benefit under 35 U.S.C. § 119 of Taiwan Application No. 092119638 filed Jul. 18, 2003. The disclosure of the prior application is hereby incorporated by reference herein in its entirety.

BACKGROUND OF THE INVENTION

1. Field of the Invention

The present invention generally relates to the processing of a tracking error signal in disk server system, and more particularly, to a method for generating a tracking error signal using a differential phase detection circuit.

2. Description of the Prior Art

Generally speaking, a pickup head is used in an ordinary optical pickup system to read data recorded on the disk tracks. Normally, there are many tracks on a disk and the pickup head moves between different tracks to read the data, the action of which is called cross-track motion. After the cross-track motion, pickup head needs and re-lock the track in order to read the data stably. When the pickup head cannot properly lock the track and read the data along the track, a tracking error is thus produced and the data cannot be read correctly.

FIG. 1 shows block diagram for generating DVD tracking error signal in a traditional disk system. Through the lens 104, the pickup head 102 focuses on a track on the surface of disk 100. And a quadrant photodetector 106 inducts signal A, signal B, signal C, and signal D. The oblique signals (signal A and signal C or signal B and signal D) go through I/V amplifier 108, 110 and are added to generate signal (A+C) and signal (B+D). Signal (A+C) goes through equalizer 112 and, after being equalized and amplified, goes through a comparator 116 for digitization. Similarly, signal (B+D) goes through equalizer 114 and comparator 118 to become digital signal.

There is almost no phase difference between the signal (A+C) and signal (B+D) when the pickup head 102 locks track correctly. Little variation among signal A, signal B, signal C and signal D inducted by the quadrant photodetector could be processed by a circuit to obtain a pickup head location. For instance: after signal (A+C) and signal (B+D) are received by phase detector 120, if the signal (A+C) is a phase lead signal, an UP clock is generated; otherwise, if signal (A+C) is phase delay signal, a DOWN clock is generated, as shown in FIG. 2. The up and down clock then go through a low pass filter 122 and 124 respectively and finally generate tracking error signal. In other words, when the crossing track of the pickup head 102 locks on the new track, no tracking error signal is generated because there is no phase difference between the signal (A+C) and signal (B+D). However, when the pickup head 102 has not completely locked, there is a phase difference between the signal (A+C) and signal (B+D), and thus a tracking error signal is generated. Optical systems adjust the pickup head location by the deviation of this tracking error signal to correctly lock the track.

According to Seong-Yun Jeong, Jung-Bae Kim and Jin-Yong Kim's report, "Analysis of DPD Signal Offset Caused by Optical Asymmetry" on SPIE Vol. 3109, the tracking error signal could be processed as the equation below, which means signals inducted by quadrant photodetector could be expressed by the equations below:

$$A=a\cos(\omega t-\Phi_A))$$

$$B=b\cos(\omega t-\Phi_B)$$

$$C=c\cos(\omega t-\Phi_C)$$

$$D=d\cos(\omega t-\Phi_D)$$

and the tracking error signal generated is $$\text{Tracking Error} = \text{Phase}(A+C) - \text{Phase}(B+D) = \frac{\Delta\Phi_{CD} + \frac{c}{a}\Delta\Phi_{AB}}{1+\frac{c}{a}} + \frac{\left(1-\frac{c}{a}\right)(\Phi_A - \Phi_C)}{\left(1+\frac{c}{a}\right)}$$

Wherein A, B, C and D are amplitude of signals inducted by 4 cells in a quadrant photodetector, a, b, c, and d, and $\Phi_A$, $\Phi_B$, $\Phi_C$, and $\Phi_D$, are, respectively, phase of their corresponding signals.

FIG. 3 shows that this sort of differential phase detection will be very sensitive to signal amplitude. FIG. 3 is to illustrate the influence on phase of the signal variation of a quadrant photodetector. For example, when the signal A on quadrant photodetector weakens, it causes bigger variation of the phase of signal (A+C). Thus, the variation of the signal becomes a miscarriage of judgment in relation to the phase variation and this affects the offset of tracking error signal and further affects the locking track point.

FIG. 1 shows the traditional phase detection circuit and the variation of the signal that causes misjudgment of phase and error for locking track point. FIG. 4 shows an improved phase detection circuit for generating a tracking error signal. The quadrant photodetector inducting signal A, signal B, signal C and signal D are digitized separately by different circuits. Separate cells induct phase difference that's caused by track crossing. This can avoid phase misjudgment from the signal variation and furthermore, accurately induct the lock track point.

However, in FIG. 4, the phase variation of signals inducted separately by quadrant photodetector is smaller and the signals make the phase signals generated by circuits that generate tracking error signal more sensitive to the phase delay and the phase lead which exist in the circuit, which can also create misjudgment of tracking error signal.

SUMMARY OF THE INVENTION

In view of prior art, there are many disadvantages in traditional tracking error circuit. The present invention provides a circuit for generating a tracking error signal using a differential phase detector to solve the problems of traditional circuit. The purpose of the present invention is to use a circuit to improve the phase difference which is caused by a circuit and further reduce lock point offset caused by non-physically produced signal phase difference and to increase accuracy of track locking and stability of tracking.

In accordance with the foregoing purpose, the present invention provides a circuit for generating a tracking error signal using a differential phase detection which comprises a quadrant photodetector for receiving an optical signal and inducting splitting signal A, splitting signal B, splitting signal C and splitting signal D. Splitting signal A and splitting signal C being added by an adder to generate a group signal (A+C). Splitting signal B and splitting signal D being added by another adder to generate a group signal (B+D). A plurality of equalizers for receiving, equalizing and amplifying the splitting signal A, splitting signal B, splitting signal C, splitting signal D, group signal (A+C), and group signal (B+D) (if a signal itself is clear and powerful enough, we can disable the corresponding equalizer). A plurality of phase detectors for receiving the output from the plurality of equalizers (or receiving directly these signal when they are clear enough) and comparing the phase difference of splitting signal A and group signal (A+C), group signal (A+C) and splitting signal B, splitting signal C and group signal (B+D), and group signal (B+D) and splitting signal D, and outputting the adjustment signals respectively. A circuit for eliminating the same phase difference in the adjustment signals by adding and subtracting (in case of high frequency noise, add low pass filter for filtering); finally, mixing adjustment signals to obtain a tracking error signal. Wherein, a plurality of comparators could be further comprised, which are connected between a plurality of equalizers and a plurality of phase detectors for transferring signals to digital signals. And splitting signal A, splitting signal B and group signal (A+C) go through a physically-equaled circuit to phase detector, and splitting signal C, splitting signal D and group signal (B+D) go through another physically-equaled circuit to phase detector. Therefore, splitting signal A, splitting signal B and group signal (A+C) circuits produce the same phase difference, and splitting signal C, splitting signal D and group signal (B+D) circuits produce the same phase difference, too. Wherein the physically-equaled circuit means that all components, all wires and geometric distribution in space and even insulating materials for insulation have no artificial difference. Which means except impurity and defect that cannot be completely removed in the real world, all parts in a circuit that could be artificially controlled are the same.

The present invention also provides a method for generating a tracking error signal using a differential phase detector circuit. Firstly, reading a plurality of splitting signals, wherein splitting signal A, splitting signal B, splitting signal C, and splitting signal D generated by the quadrant photodetector being read by a pickup head, group signal (A+C) and group signal (B+D) formed by mixing splitting signal A and splitting signal C, and splitting signal B and splitting signal D. And connecting said plurality of signals to a plurality of phase detectors. A plurality of phase detectors then generates a plurality of up clock signals and down clock signals. And then processing the plurality of up clock signals to obtain an up signal and processing the plurality of down clock signals to obtain a down signal for eliminating phase difference produced from going through the circuit. Finally, comparing the up signal and the down signal to obtain and output tracking error signal. Of course, it could be further filtered to eliminate noise or transferred to digital signal before further processing if needed. Of course, the present invention can also be applied to photodetectors other than quadrant photodetectors, such as sextant photodetectors or octant photodetectors. Variations of the method provided by the present invention comprise those in which signals generated by photodetectors are divided into two parts (two group signals) and all signals comprised by each group signal are added and the same process is carried out.

To conclude the foregoing, in a traditional tracking error circuit frame, the variation of a signal can easily influence the phase difference and make tracking offset and cause locking track point to be offset. In an improved tracking error circuit frame, the phase leading and the phase delay by the circuit still influence the tracking signal. As a result, the present invention provides a tracking error signal using a differential phase detector frame and uses the same phase difference signals to inter-eliminating phase difference for improving phase variation caused by the circuit. Furthermore, it reduces the non-physically produced phase lock point to be offset and increases the accuracy of track locking and stability of tracking.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DESCRIPTION OF THE PREFERRED EMBODIMENTS

In the following, some preferred embodiments of the invention would be described in greater detail. Nevertheless, it should be recognized that the present invention could be practiced in a wider range in other embodiments beside those explicitly described, and the scope of the present invention is not limited by these expressed embodiments but specified in the accompanying claims.

A preferred embodiment of the present invention is a circuit for generating a tracking error signal using a differential phase detection, which comprises, a quadrant photodetector for receiving an optical signal and generating splitting signal A, splitting signal B, splitting signal C and splitting signal D, wherein splitting signal A and splitting signal C being added by an adder to form a group signal (A+C) and splitting signal B and splitting signal D being added by another adder to form another group signal (B+D). A plurality of equalizers for receiving, equalizing and amplifying the splitting signal A, splitting signal B, splitting signal C, splitting signal D, group signal (A+C) and group signal (B+D). A plurality of phase detectors for receiving the output of equalizers and comparing the phase difference between splitting signal A and group signal (A+C), group signal (A+C) and splitting signal B, splitting signal C and group signal (B+D), and group signal (B+D) and splitting signal D, and outputting adjustment signals respectively. A circuit for eliminating the same phase difference in the adjustment signals by adding and subtracting, Low pass filters and a comparator for filtering and comparing adjustment signals and outputting a tracking error signal. Wherein, it further comprises a plurality of comparators, which are connected between a plurality of equalizers and a plurality of phase detectors for transferring the signal to a digital signal. And foregoing splitting signal A, splitting signal B and group signal (A+C) go through physically-equaled circuit to the phase detector and splitting signal C, splitting signal D and group signal (B+D) go through physically-equaled circuit to phase detector.

Figure 5:
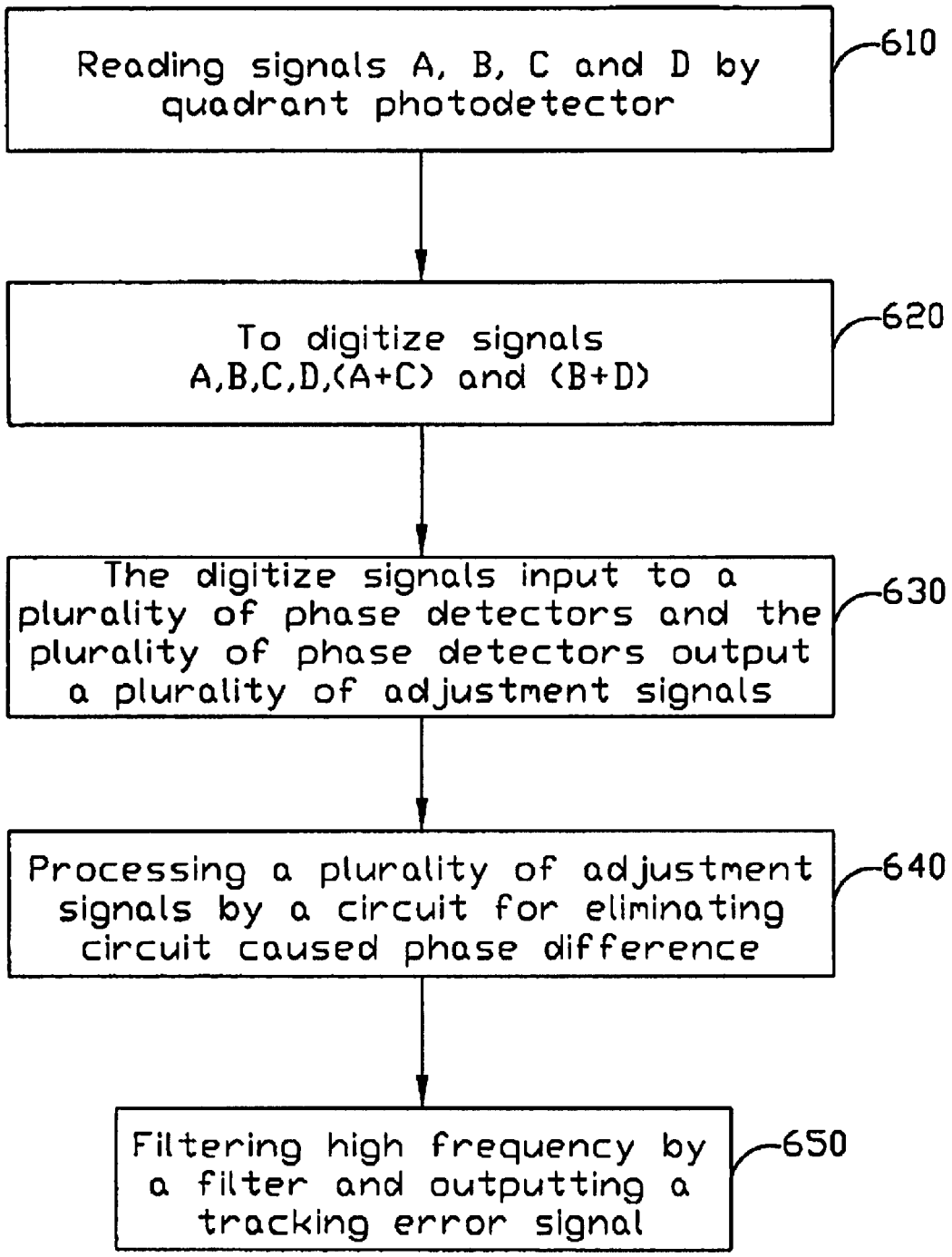
FIG. 5 shows method and flow chart of the present invention.

The following is the detailed description of the present invention. Referring to FIG. 5, it is the flow chart of the present invention, generating a tracking error signal using differential phase detection. Firstly, as step 610 shows, the splitting signal A, signal B, signal C and signal D, generated by a quadrant photodetector are read by a pickup head. As the following step 620 shows, the previously generated splitting signal A, splitting signal B, splitting signal C and splitting signal D, including group signal (A+C) and group signal (B+D) mixed by a circuit, are received by and sent by a first equalizer, second equalizer, third equalizer, fourth equalizer, fifth equalizer and sixth equalizer.

In the following, as step 630 shows, a phase detector receives splitting signal A and group signal (A+C) outputted by the first equalizer and the fifth equalizer, compares phase difference of splitting signal A and that of group (A+C), and outputs an Up clock signal and a Down clock signal; then a second phase detector receives group signal (A+C) outputted by the fifth equalizer and splitting signal B outputted by the second equalizer, compares the phase difference of group signal (A+C) and that of splitting signal B, and outputs an Up clock signal and a Down clock signal. The third phase detector receives splitting signal C outputted by the third equalizer and group signal (B+D) outputted by the sixth equalizer, compares the phase difference of group signal (B+D) and that of splitting signal C, and outputs an Up clock signal and a Down clock signal. The fourth phase detector receives group signal (B+D) outputted by the sixth equalizer and splitting signal D outputted by the fourth equalizer, compares the phase difference of group signal (B+D) and that of splitting signal D, and outputs an Up clock signal and a Down clock signal. And then, as step 640 shows, a circuit is used to deal with a plurality of lead Up clock signals or delay Down clock signals to eliminate phase differences generated by the circuit, which means an UP signal is achieved by subtracting the result of adding Up clock signals outputted by the third phase detector and the fourth phase detector from the result of adding Up clock signals outputted by the first phase detector and the second detector and making adjustment. Then, two UP signals that are mutually subtracted and compared are outputted to a first low pass filter for filtering the high frequency noise. Similarly, a DOWN signal can also be achieved by subtracting the result of adding Down clock signals outputted by the third phase detector and the fourth phase detector from the result of adding Down clock signals outputted by the first phase detector and the second detector and making adjustment. Then, two DOWN signals that are mutually subtracted and compared are outputted to a second low pass filter. Finally, the output of first low pass filter and output of second low pass filter are added for generating a tracking error signal. Wherein, a plurality of comparators could be further used in transforming a signal outputted from the equalizer to a digital signal before the following procedures; the digitizing process can also take place after forming a tracking error signal.

As the foregoing said, the characteristics of the present invention such as step 630, splitting signal A, splitting signal B and group signal (A+C) going through a set of physically-equaled circuits to a set of phase detectors, and splitting signal C, splitting signal D and group signal (B+D) going through another set of physically-equaled circuits to another set of phase detectors. So splitting signal A, splitting signal B and group signal (A+C) have the same phase difference produced by a circuit; and splitting signal C, splitting signal D and group signal (B+D) have the same phase difference produced by a circuit. Since the phase difference produced on a circuit is different from the phase between the UP signal and DOWN signal outputted from a phase detector, thus the present invention has a circuit for comparing and processing (subtracting one from another, for example) the phase difference of an UP signal and DOWN signal in the same phase detector set, as described in step 640. In other words, the characteristic of the present invention is based on making received split signals go through physically-equaled circuits to a plurality of phase detectors, and in the processing phase. And to have a circuit between the phase detector and the filter to process the phase, and to subtract one signal from another that has the same phase difference to completely eliminate the influence of phase difference produced by a real circuit. Of course, here it only eliminates the phase difference by inter-subtracting. The adjustment of the whole circuit still depends on the real needs when dealing with the UP clock signal and Down signal and performing an interaction with the UP clock signal and Down signal.

Figure 6:
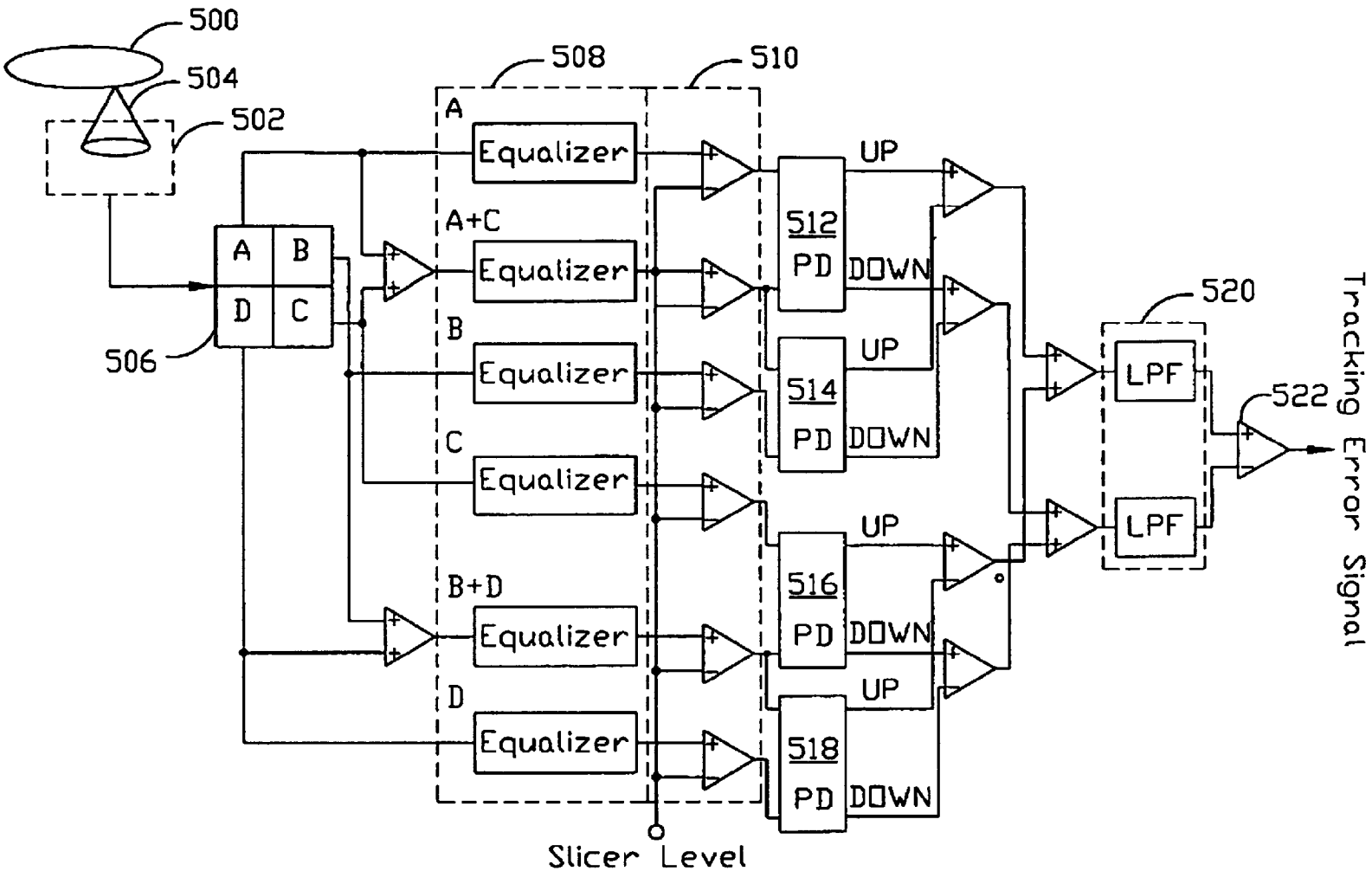
FIG. 6 shows the preferred embodiment of the present invention.

FIG. 6 shows the circuit of another preferred embodiment of the invention. Wherein, the pickup head 502, through lens 504 tracking, reads the optical signal on the surface of the disk 500. The quadrant photodetector 506 has four cells: cell A, cell B, cell C and cell D. Cells of the quadrant photodetector 506 receive and induct the optical signal transmitted by the lens 504, and then output splitting signal A, splitting signal B, splitting signal C and splitting signal D. Splitting signal A and splitting signal C are mixed to form group signal (A+C) by a circuit and splitting signal B and splitting signal D are mixed to form group signal (B+D) by another circuit.

Reference to FIG. 6 continued. In the following, splitting signal A, splitting signal B, splitting signal C, splitting signal D, group signal (A+C) and group signal (B+D) go through a plurality of corresponded equalizers 508 for being equalized and amplified and for filtering the high frequency noise. The signal is transferred to a digital signal by the comparator 510. Which means analog signals received by the quadrant photodetector 506 must go through the comparator 510 to be transferred to and outputted as digital signal.

In circuit constitution showed in FIG. 6, group signal (A+C) and group signal (B+D) could be shared with focus error. And in this preferred embodiment, splitting signal A, splitting signal B and group signal (A+C) pass through the physically-equaled circuit and the influence of the phase leading and phase delay produced by a circuit are the same. Similarly, splitting signal C, splitting signal D and group signal (B+D) pass through the physically-equaled circuit and the influence from the phase leading and phase delay produced by the circuit are the same, too. In other words, for the real circuit, splitting signal A and splitting signal B inducted by cell A and cell B of a quadrant photodetector 506 and group signal (A+C), inducted by mixing cell A with cell C pass through the physically-equaled circuit to a phase detector 512 and a phase detector 514 for signal phase comparing. Since these signals pass through the physically-equaled circuit, the phase influence that is caused by circuit must also be the same. Splitting signal A, splitting signal B and group signal (A+C) pass through the circuit and generate a phase difference, which is defined as $\Delta\Phi_1$. Splitting signal C, splitting signal D and group signal (B+D) pass through a circuit and generate a phase difference, which is defined as $\Delta\Phi_2$. According to the foregoing, the comparative phase outputted by each phase detector could be explained by the equations below:

$$\text{Phase Detector } \mathbf{512} = \text{Phase}(A) - \text{Phase}(A+C) + \Delta\Phi_1$$

$$\text{Phase Detector } \mathbf{514} = \text{Phase}(B) - \text{Phase}(A+C) + \Delta\Phi_1$$

$$\text{Phase Detector } \mathbf{516} = \text{Phase}(C) - \text{Phase}(B+D) + \Delta\Phi_2$$

$$\text{Phase Detector } \mathbf{518} = \text{Phase}(D) - \text{Phase}(B+D) + \Delta\Phi_2$$

Signals generated by the phase detector go through a low pass filter 520 and a comparator 522 for filtering. A tracking error signal is obtained by putting output signal generated by each phase detector through low pass filter 520 and filtering process of comparator 522, which could be explained by the equation below.

$$\text{TE(Tracking Error)} = [\text{Phase}(A) - \text{Phase}(A+C) + \Delta\Phi_1] - [\text{Phase}(B) - \text{Phase}(A+C) + \Delta\Phi_1] + [\text{Phase}(C) - \text{Phase}(B+D) + \Delta\Phi_2] - [\text{Phase}(D) - \text{Phase}(B+D) + \Delta\Phi_2]$$

By extending the equation, $\Delta\Phi_1$ and $\Delta\Phi_2$ in the equation will be inter-eliminated, and phase (A+C) and phase (B+D) are inter-eliminating, too. The equation will be finally reduced as follows:

$$\text{TE} = [\text{Phase}(A) - \text{Phase}(B)] + [\text{Phase}(C) - \text{Phase}(D)]$$

By referring to the reduced equation above, we can see $\Delta\Phi_1$ and $\Delta\Phi_2$, phase difference produced by the circuit, are eliminated. Therefore it could be understood that tracking error signal generated by the present invention can respond to real signal phase, which is not influenced by the phase difference that's caused by a circuit.

Figure 1:
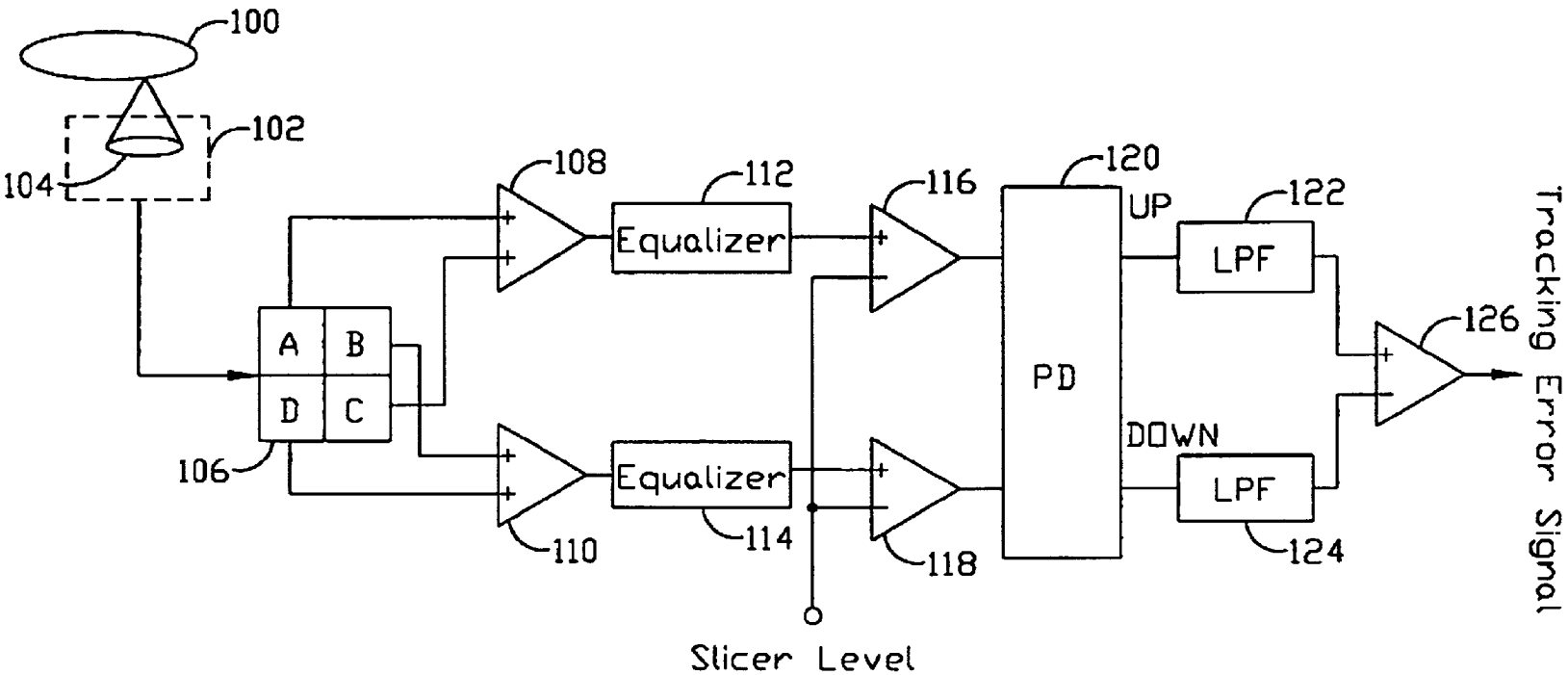
FIG.1(Prior Art)
FIG. 1 shows frame block diagram of prior art for generating tracking error signal.
Figure 2:
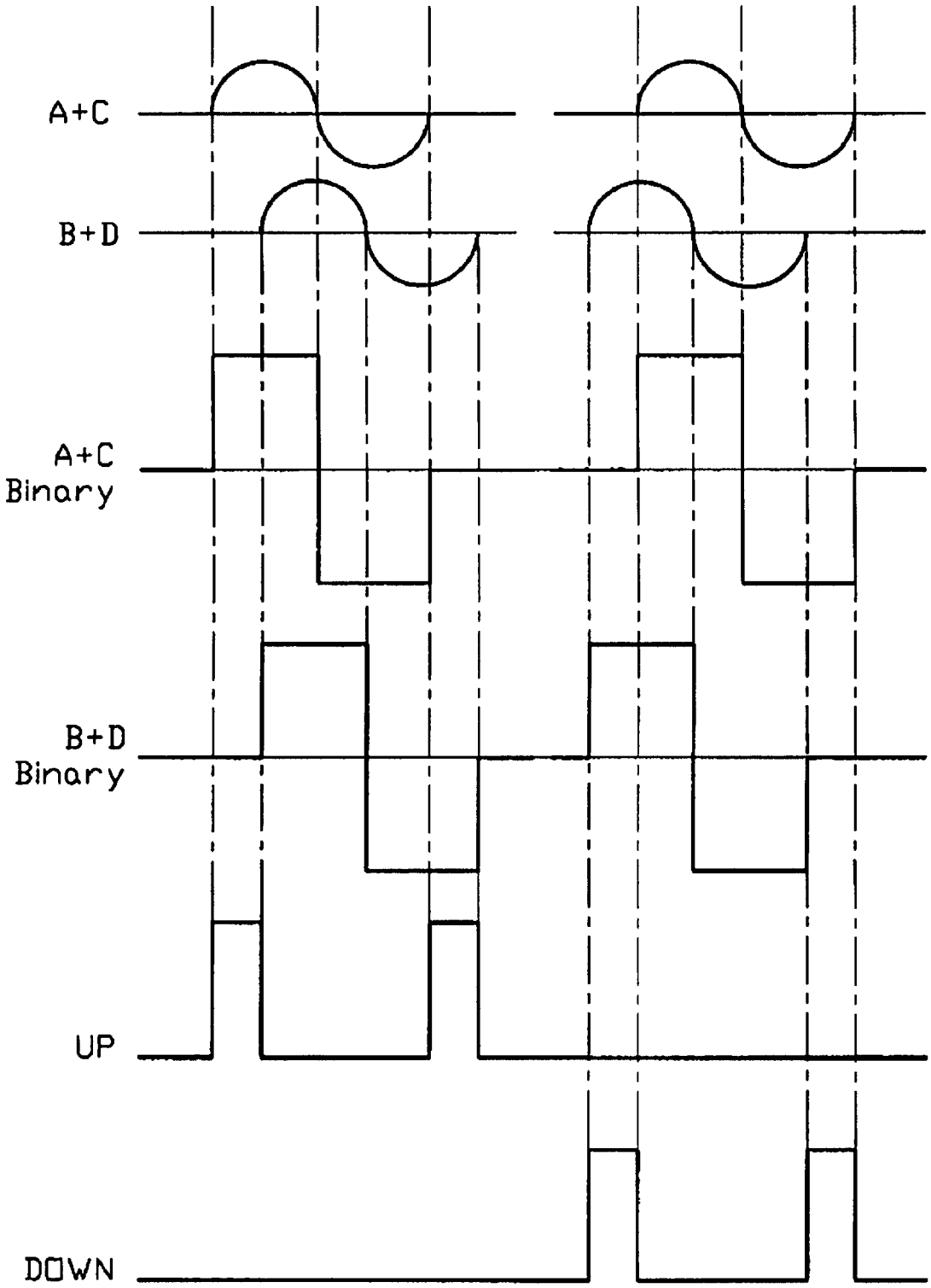
FIG.2(Prior Art)
FIG. 2 shows signal phase variation of FIG. 1.
Figure 3:
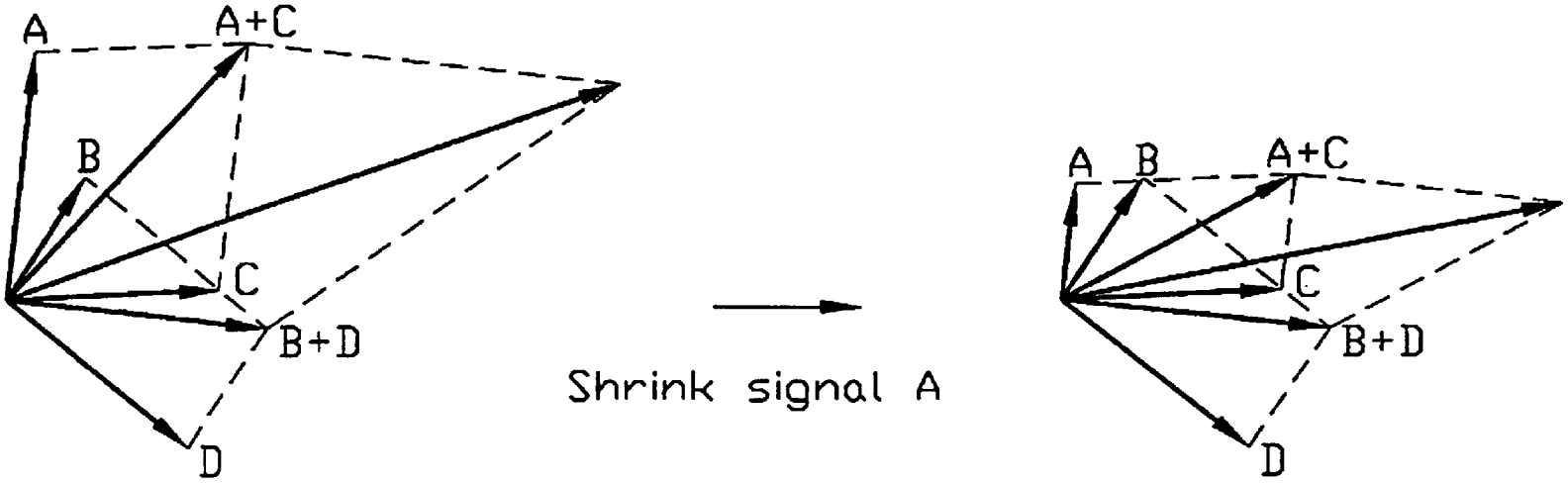
FIG.3(Prior Art)
FIG. 3 shows influence of signal variation on its phase judgement.
Figure 4:
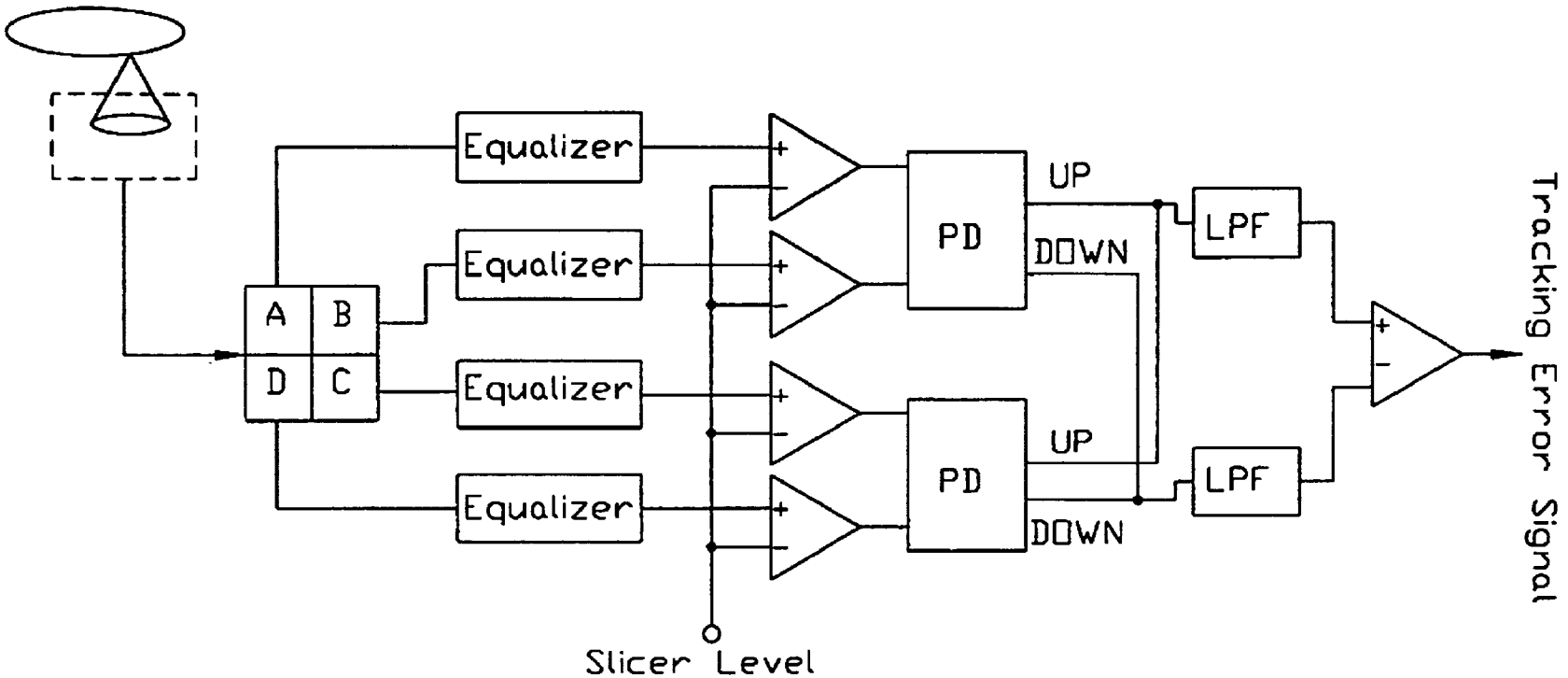
FIG.4(Prior Art)
FIG. 4 shows frame block diagram of prior art for generating tracking error signal having independent signal inducting.

This preferred embodiment and circuit structure showed in FIG. 4 both first separate signal A, signal B, signal C and signal D inducted by a quadrant photodetector and use each separate cell to induct the phase difference which is caused by the crossing track for generating tracking error signal. In traditional tracking error circuit, variations such as phase delay or phase lead will occur on its circuit and will influence phase of phase detector. However, the present invention provides a differential phase and a circuit to eliminate the phase differences caused by the circuit. As a result, this can completely eliminate phase difference on the circuit and enormously reduce the probability of an offset tracking point or tracking error and efficiently improve the accuracy of tracking error.

Moreover, the generation of tracking error signal in the present invention only needs group signal (A+C) and group signal (B+D), therefore as long as group signal (A+C) and group signal (B+D) could be produced, there is no limit to the amount of wires and phase detectors and the sort of circuit needed to eliminate the phase of the Up clock signal and Down clock signal. The present invention only needs to keep an equal phase difference for every wire (at least making some circuits connected to several phase detectors with which output signals will have direct interaction have the same phase difference), compare this phase difference with Up clock signal and Down clock signal of phase detector, and then process Up clock signal from different phase detectors with a circuit (eliminating phase difference of Up clock signal caused by the circuit). Similarly, a circuit is used to process Down clock signal from different phase detectors (eliminating phase difference of Down clock signal caused by the circuit) to ensure complete elimination of phase difference on the circuit.

Of course, it is to be understood that the present invention is not limited by these disclosed embodiments. Various modification and similar changes are still possible within the spirit of the present invention. In this way, the scope of the present invention should be defined by the appended claims.

What is claimed is:

1. A method for generating a tracking error signal using differential phase detection, comprising:

reading a plurality of splitting signals, which are inducted by a quadrant photodetector and read by a pick-up, wherein said plurality of splitting signals are further equally divided into two groups signals and at least one signal comprised in each group being mixed;

generating a plurality of up clock signals and a plurality of down clock signals, wherein said plurality of splitting signals and said two groups signals are connected to a plurality of phase detectors, and said plurality of phase detectors generate said up clock signals and said down clock signals;

processing said plurality of up clock signals and said plurality of down clock signals, wherein said up clock signals are processed to obtain a up signal and said down clock signals are processed to obtain a down signal for eliminating phase difference caused by circuit; and outputting a tracking error signal obtained by comparing said up signal and said down signal.

2. The method according to claim 1, further comprising digitizing said plurality of splitting signals and said two groups signals and then generating said plurality of up signals and said plurality of down signals.

3. The method according to claim 1, wherein a plurality of comparators compare any one of said plurality of splitting signals, said two groups signals and a reference signal one by one, and then input the result to said plurality of phase detectors.

4. The method according to claim 1, wherein any one of said plurality of splitting signals is obtained by processing all of said splitting signals it comprise using adders.

5. The method according to claim 1, further comprising filtering high frequency noise of said up signal and said down signal, and then output said tracking error signal.

6. The method according to claim 2, wherein said splitting signal A, said splitting signal B and said group signal (A+C) in said digitizing process are input to said plurality of phase detectors through a set of physically-equaled circuit, and said splitting signal C, said splitting signal D and said group signal (B+D) are input to said plurality of phase detectors through another set of physically-equaled circuit.

7. The method according to claim 1, wherein a subtracting circuit is used to process said plurality of up clock signals to obtain said up signal, and said subtracting circuit is used to process said plurality of down clock signals to obtain said down signal.

8. The method according to claim 1, wherein said up signal is corresponded to one of said group signal and said down signal is corresponded to another of said group signal first and said tracking error signal is achieved by comparing said up signal and said down signal.

9. A circuit for generating a tracking error signal using differential phase detection, comprising:

a quadrant photodetector for receiving an optical signal and generating a splitting signal A, a splitting signal B, a splitting signal C and a splitting signal D, wherein said splitting signal A adding said splitting signal C by an adder for forming a group signal (A+C), and said splitting signal B adding said splitting signal D by another adder for forming a group signal (B+D);

a plurality of equalizer for receiving, equalizing and amplifying said splitting signal A, said splitting signal B, said splitting signal C, said splitting signal D, said group signal (A+C) and said group signal (B+D);

a plurality of phase detectors for receiving output of said plurality of equalizers, comparing phase difference between said splitting signal A and said group signal (A+C), said group signal (A+C) and said splitting signal B, said splitting signal C and said group signal (B+D), and said group signal (B+D) and said splitting signal D, and outputting a plurality of adjusting signals respectively;

a treating circuit for comparing said plurality of adjusting signals outputted by said plurality of phase detectors to obtain an up signal and a down signal;

a plurality of low pass filters for eliminating the high frequency noise of said up signal and down signal; and a comparator for comparing said up signal and down signal to obtain a tracking error signal.

10. The circuit according to claim 9, said circuit further comprising a plurality of comparators which are connected between said plurality of equalizers and said plurality of phase detectors for transferring signal to digital signal.

11. The circuit according to claim 9, wherein said splitting signal A, said splitting signal B and said group signal (A+C) are inputted through a set of physically-equaled circuit to said phase detector and said splitting signal C, said splitting signal D and said group signal (B+D) are inputted through another set of physically-equaled circuit to said phase detector.

12. The circuit according to claim 9, wherein said plurality of adjusting signals comprises a plurality of up clock signals and a plurality of down clock signals.

13. The circuit according to claim 9, wherein said comparing method of said plurality of adjusting signals are treated by at least one subtractor for eliminating phase difference caused by circuits.

14. A circuit for generating a tracking error signal using differential phase detection comprises:

a first equalizer for receiving a splitting signal A generated by a quadrant photodetector and equalizing and amplifying said splitting signal A;

a second equalizer for receiving a splitting signal B generated by a quadrant photodetector and equalizing and amplifying said splitting signal B;

a third equalizer for receiving a splitting signal C generated by a quadrant photodetector and equalizing and amplifying said splitting signal C;

a fourth equalizer for receiving a splitting signal D generated by a quadrant photodetector and equalizing and amplifying said splitting signal D;

a fifth equalizer for receiving a group signal (A+C) and equalizing and amplifying said group signal (A+C), wherein said group signal (A+C) is formed by adding said splitting signal A and said splitting signal B by another adder;

a sixth equalizer for receiving a group signal (B+D) and equalizing and amplifying said group signal (B+D), wherein said group signal (B+D) is formed by adding said splitting signal B and said splitting signal D by another adder;

a first phase detector for receiving and comparing said splitting signal A and said group signal (A+C) and outputting an up clock signal and a down clock signal, wherein said splitting signal A being outputted from said first equalizer and said group signal (A+C) being outputted from said fifth equalizer;

a second phase detector for receiving and comparing said splitting signal (A+C) and said group signal B and outputting an up clock signal and a down clock signal, wherein said group signal (A+C) being outputted from said fifth equalizer and said splitting signal B being outputted from said second equalizer;

a third phase detector for receiving and comparing said splitting signal C and said group signal (B+D) and outputting an up clock signal and a down clock signal, wherein said splitting signal C being outputted from said third equalizer and said group signal (B+D) being outputted from said sixth equalizer;

a fourth phase detector for receiving and comparing said group signal (B+D) and said splitting signal D and outputting an up clock signal and a down clock signal, wherein said group signal (B+D) being outputted from said sixth equalizer and said splitting signal D being outputted from said fourth equalizer;

a treating circuit for processing and comparing said plurality of up clock signals and down clock signals outputted by said plurality of phase detectors to obtain an up signal and a down signal, said up signal being obtained by adding up clock signal outputted by said first phase detector and up clock signal outputted by said second phase detector and then subtracting the result of adding up clock signal of said third phase detector and that of said fourth phase detector, said down signal being obtained by adding down clock signal outputted by said first phase detector and down clock signal outputted by said second phase detector and then subtracting the result of adding down clock signal of said third phase detector and that of said fourth phase detector;

a first low pass filter for receiving said up signal;

a second low pass filter for receiving said down signal; and a comparator for comparing output signal of said first low pass filter and said second low pass filter and generating a tracking error signal.

15. The circuit according to claim 14, said circuit for generating said tracking error signal using differential phase detection further comprising:

a first comparator for transferring output signal of said first equalizer to digital signal;

a second comparator for transferring output signal of said second equalizer to digital signal;

a third comparator for transferring output signal of said third equalizer to digital signal;

a fourth comparator for transferring output signal of said fourth equalizer to digital signal;

a fifth comparator for transferring output signal of said fifth equalizer to digital signal; and a sixth comparator for transferring output signal of said sixth equalizer to digital signal.

16. The circuit according to claim 14, wherein said splitting signal A, said splitting signal B and said group signal (A+C) are inputted through physically-equaled circuit to said first phase detector and said second phase detector.

17. The circuit according to claim 14, wherein said splitting signal C, said splitting signal D and said group signal (B+D) are inputted through physically-equaled circuit to said third phase detector and said fourth phase detector.

18. The circuit according to claim 14, wherein the same phase offset is caused on the circuit through which said splitting signal A, said splitting signal B and said group signal (A+C) go.

19. The circuit according to claim 14, wherein the same phase offset is caused on the circuit through which said splitting signal C, said splitting signal D and said group signal (B+D) go.

20. The circuit according to claim 14, wherein the comparing of said plurality of up signals and said plurality of down signals are treated by a subtract circuit.

*21. A method for generating a tracking error signal using differential phase detection, comprising:*

*generating multiple splitting signals from an optical signal using a photo-detector;*

*generating multiple group signals, wherein each of the multiple group signals is formed by mixing a first splitting signal with a second splitting signal;*

*supplying the multiple splitting signals and the multiple group signals to multiple phase detectors, wherein the multiple phase detectors generate multiple up clock signals and multiple down clock signals based on phase difference values of the multiple splitting signals and the multiple group signals; and*

*computing the tracking error signal by determining a difference of amplitude between a combined set of the multiple up clock signals and a combined set of the multiple down clock signals.*

*22. The method of claim 21, wherein each of the multiple phase detectors computes a phase difference between one of the multiple splitting signals and one of the multiple group signals.*

*23. The method of claim 21, wherein the multiple splitting signals and the multiple group signals are digitized prior to being supplied to the multiple phase detectors.*

*24. The method of claim 21, further comprising:*

*filtering high frequency noise of the combined set of up clock signals and the combined set of down clock signals prior to computing the tracking error signal.*

*25. A method for generating a tracking error signal using differential phase detection, comprising:*

*generating multiple splitting signals from an optical signal using a photo-detector;*

*generating multiple group signals, wherein each of the multiple group signals is formed by mixing a first splitting signal with a second splitting signal;*

*supplying the multiple splitting signals and the multiple group signals to multiple phase detectors, wherein each of the multiple phase detectors computes a phase difference between a particular splitting signal and a particular group signal and generates a corresponding adjusting signal; and*

*processing the adjusting signals received from the multiple phase detectors to compute the tracking error signal.*

*26. The method of claim 25, further comprising:*

*processing the adjusting signals received from the multiple phase detectors to generate an up clock signal and a down clock signal; and*

*computing the tracking error signal by determining a difference in amplitude between the up clock signal and the down clock signal.*

*27. A circuit for generating a tracking error signal using differential phase detection, comprising:*

*a photo-detector configured to receive an optical signal and to generate multiple splitting signals;*

*a mixer configured to generate multiple group signals, wherein each group signal is formed by mixing a first splitting signal with a second splitting signal;*

*multiple phase detectors configured to receive the multiple splitting signals and the multiple group signals, wherein each of the multiple phase detectors is further configured to compute a phase difference between a particular splitting signal and a particular group signal and to generate a corresponding adjusting signal; and*

*a tracking error computing module configured to process the adjusting signals received from the multiple phase detectors and to compute the tracking error signal.*

*28. The circuit of claim 27, further comprising:*

*a digitizer configured to digitize the multiple splitting signals and the multiple group signals prior to supplying the multiple splitting signals and the multiple group signals to the multiple phase detectors.*

*29. The circuit of claim 27, wherein the tracking error computing module further comprises:*

*an adjusting module configured to process the adjusting signals received from the multiple phase detectors and to generate an up clock signal and a down clock signal; and*

*a comparator configured to compute the tracking error signal by determining a difference in amplitude between the up clock signal and the down clock signal.*

*30. The circuit of claim 29, further comprising:*

*a filter configured to filter high frequency noise of the up clock signal and the down clock signal prior to supplying the up clock signal and the down clock signal to the comparator.*

* * * * *